(12) United States Patent
Ogasawara

(10) Patent No.: US 10,209,104 B2
(45) Date of Patent: Feb. 19, 2019

(54) ABSOLUTE ENCODER, PROCESSING METHOD, PROGRAM, DRIVING APPARATUS, AND INDUSTRIAL MACHINE

(71) Applicant: CANON KABUSHIKI KAISHA, Tokyo (JP)

(72) Inventor: Makiko Ogasawara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/685,032

(22) Filed: Apr. 13, 2015

(65) Prior Publication Data

US 2015/0292919 A1    Oct. 15, 2015

(30) Foreign Application Priority Data

Apr. 14, 2014 (JP) ................. 2014-083137

(51) Int. Cl.
| | |
|---|---|
| *G05D 3/20* | (2006.01) |
| *G01D 5/347* | (2006.01) |
| *G01D 5/244* | (2006.01) |
| *G01D 5/249* | (2006.01) |
| *G01D 5/245* | (2006.01) |

(52) U.S. Cl.
CPC ....... *G01D 5/34776* (2013.01); *G01D 5/2495* (2013.01); *G01D 5/24461* (2013.01); *G01D 5/24495* (2013.01); *G01D 5/34715* (2013.01); *G01D 5/34792* (2013.01); *G05D 3/20* (2013.01); *G01D 5/2455* (2013.01)

(58) Field of Classification Search
CPC ........... G01D 5/34776; G01D 5/24495; G01D 5/24461; G01D 5/2495; G01D 5/34715; G01D 5/2455; G05D 3/20
See application file for complete search history.

(56) References Cited

U.S. PATENT DOCUMENTS

| | | | | |
|---|---|---|---|---|
| 6,392,224 | B1 * | 5/2002 | Holzapfel | G01D 5/366 250/231.13 |
| 6,664,535 | B1 * | 12/2003 | Nahum | G01D 5/34792 250/231.14 |
| 2004/0118758 | A1 * | 6/2004 | Gordon-Ingram | G01D 5/34792 210/100 |
| 2004/0216320 | A1 * | 11/2004 | Birrer | B66B 1/3492 33/708 |

(Continued)

FOREIGN PATENT DOCUMENTS

| | | |
|---|---|---|
| DE | 19638912 A1 | 3/1998 |
| EP | 0789226 A1 | 8/1997 |

(Continued)

*Primary Examiner* — Shawki S Ismail
*Assistant Examiner* — Muhammad S Islam
(74) *Attorney, Agent, or Firm* — Canon U.S.A., Inc. IP Division

(57) ABSTRACT

An absolute encoder includes a scale having a sequence of marks, a detector configured to detect a signal corresponding to a plurality of marks of the scale, and a processor configured to obtain an absolute position corresponding to the signal. The processor is configured to select code sequences, from a group of code sequences corresponding to absolute positions, as a candidate group for a code sequence corresponding to the signal, and to select the code sequence corresponding to the signal from the candidate group.

21 Claims, 14 Drawing Sheets

(56) References Cited

U.S. PATENT DOCUMENTS

| | | | | |
|---|---|---|---|---|
| 2005/0060905 A1* | 3/2005 | Novak | ............... | G01D 5/2495 33/706 |
| 2010/0057392 A1* | 3/2010 | York | ............... | G01D 5/24476 702/94 |
| 2011/0128396 A1* | 6/2011 | Yano | ............... | G01D 5/2497 348/222.1 |
| 2012/0032068 A1* | 2/2012 | Ishizuka | ............ | G01D 5/34707 250/231.1 |

FOREIGN PATENT DOCUMENTS

| JP | 2004-529344 A | 9/2004 |
|---|---|---|
| JP | 2011158302 A | 8/2011 |
| JP | 2013221795 A | 10/2013 |

\* cited by examiner

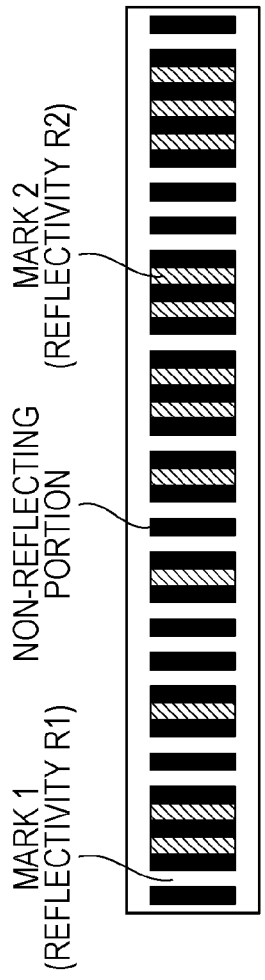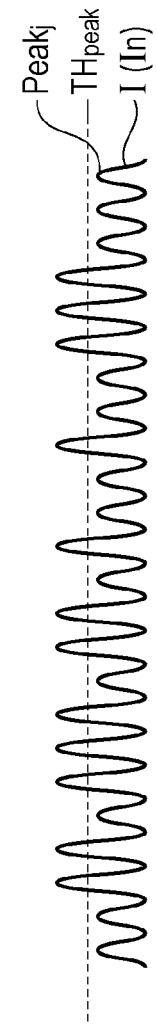

ABSOLUTE ENCODER, PROCESSING METHOD, PROGRAM, DRIVING APPARATUS, AND INDUSTRIAL MACHINE

BACKGROUND OF THE INVENTION

Field of the Invention

The present invention relates to an absolute encoder, a processing method, a program, a driving apparatus, and an industrial machine.

Description of the Related Art

Incremental encoders and absolute encoders have been used to measure the position or angle of an object. Absolute encoders can obtain an absolute position by detecting marks corresponding to a sequence of codes, such as maximum length sequence (m-sequence) codes or Gray codes, and thus do not require an origin detecting function for obtaining the absolute position. Incremental encoders having an origin detecting function require origin detection when they cannot accurately measure an absolute position because of, for example, high-speed movement beyond an allowable range. Although absolute encoders do not require origin detection, they may generate an incorrect code sequence due to scratches or dust on the scale or detecting unit. A method described in PCT Japanese Translation Patent Publication No. 2004-529344 is known as a technique used to address such a problem. This method compares a code sequence obtained by detection of marks with each of code sequences in a lookup table prepared in advance, and selects a code sequence having a good match in the lookup table.

The method described in PCT Japanese Translation Patent Publication No. 2004-529344 compares a code sequence obtained by detection of marks with all code sequences in the lookup table. Therefore, if a code sequence having a good match with an incorrect code sequence is selected, an incorrect absolute position may be output. Also, if the total number of code sequences in the lookup table increases with an increase in scale length or a decrease in mark pitch, the time or load required for the comparison may increase.

SUMMARY OF THE INVENTION

The present invention provides an absolute encoder which is advantageous, for example, in terms of efficiency and accuracy in selecting a code sequence.

According to an aspect of the present invention, an absolute encoder includes a scale having a sequence of marks, a detector configured to detect a signal corresponding to a plurality of marks of the scale, and a processor configured to obtain an absolute position corresponding to the signal. The processor is configured to select code sequences, from a group of code sequences corresponding to absolute positions, as a candidate group for a code sequence corresponding to the signal, and to select the code sequence corresponding to the signal from the candidate group.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIGS. 3A to 3C illustrate a relationship between a scale, a detection signal, and a code sequence.

FIG. 7 illustrates a concrete example of selecting a code sequence (with no error in acquisition of a code sequence).

FIG. 8 illustrates a concrete example of selecting a code sequence (with a few errors in acquisition of a code sequence).

FIG. 9 illustrates a concrete example of selecting a code sequence (with many errors in acquisition of a code sequence).

DESCRIPTION OF THE EMBODIMENTS

First Embodiment

Figure 1:
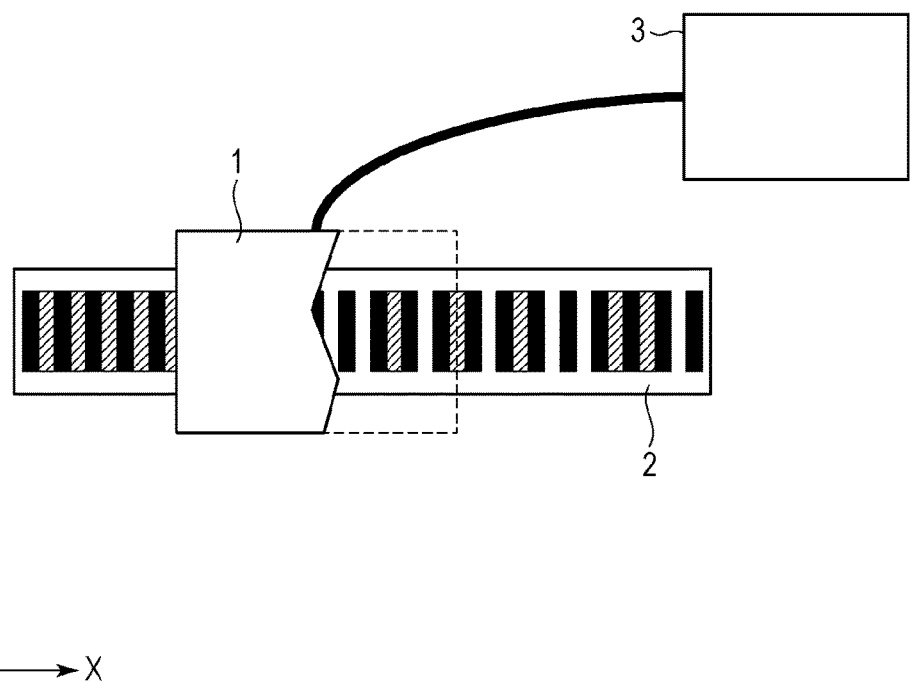
FIG. 1 illustrates a configuration of an absolute encoder according to an embodiment.

Embodiments of the present invention will now be described with reference to the attached drawings. In principle (unless otherwise stated), the same components are given the same reference numerals throughout the drawings for explaining the embodiments, and their repetitive description will be omitted.

FIG. 1 illustrates a configuration of an absolute encoder according to an embodiment. The absolute encoder includes a scale 2 having a sequence of marks, a detecting unit 1 (detector or reading head) configured to detect a signal corresponding to a plurality of marks of the scale 2, and a processing unit 3 (processor or controller) configured to determine an absolute position corresponding to the signal. The detecting unit 1 and the scale 2 may be mounted on a first object and a second object (not shown) that are relatively displaceable from each other.

Figure 2:
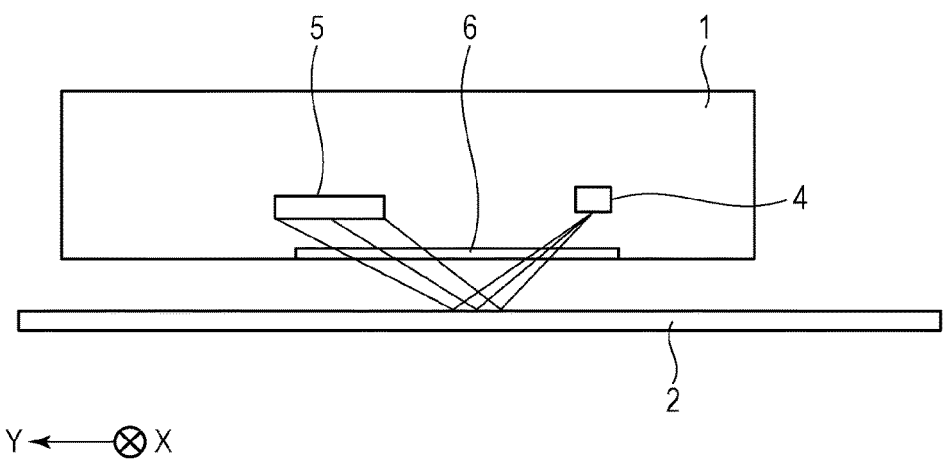
FIG. 2 illustrates a configuration of a detector of the absolute encoder.

FIG. 2 illustrates a configuration of the detecting unit 1 of the absolute encoder. The detecting unit 1 may include a light source 4, a light receiving element array 5 (e.g., photo-diode array), and a cover glass 6. Beams of light radiating from the light source 4 pass through the cover glass 6 to illuminate the scale 2. Then, the beams of light reflect off the scale 2 and pass through the cover glass 6 to illuminate the light receiving element array 5. The detecting unit 1 and the scale 2 are relatively movable in the direction along the Y-axis in the drawing (one of the detecting unit 1 and the scale 2 is typically, but not always, secured in place). The light receiving element array 5 may be a line sensor including light receiving elements, each having a longitudinal direction orthogonal to the direction of movement (i.e., the longitudinal direction is along the X-axis in the drawing). Since pitches of the light receiving elements are sufficiently smaller than pitches of marks of the scale 2 projected in a larger size onto the light receiving element array 5, a signal obtained by photoelectric conversion in the light receiving element array 5 has a near-sinusoidal periodic waveform.

In the present embodiment, the scale 2 has a plurality of two or more types of marks periodically arranged at intervals. The marks are arranged along the direction of relative movement of the detecting unit 1 and the scale 2, and they each have a property (e.g., reflectivity or reflectance) corresponding to each code in a code sequence representing an absolute position. In the present embodiment, the code sequence is a 6-bit binary data sequence (binary code sequence) and may be formed by a binary pseudorandom number sequence. Although binary codes will be presented as exemplary codes that form the code sequence in the present embodiment, M-level codes (M is a natural number greater than 2) may be adopted. The scale 2 has reflecting and non-reflecting portions alternately arranged at regular pitches, and two types of values are adopted to represent reflectivities of the reflecting portions. Thus, a binary code sequence can be associated with a plurality of marks. In the scale 2, a reflectivity corresponding to code 1 is represented by R1 and a reflectivity corresponding to code 0 is represented by R2. FIGS. 3A to 3C illustrate a relationship between a scale, a detection signal, and a code sequence. FIG. 3A illustrates the scale 2, FIG. 3B illustrates a signal I obtained by photoelectric conversion in the light receiving element array 5, and FIG. 3C illustrates a code sequence obtained by the processing unit 3 on the basis of the signal I. As illustrated in FIG. 3A, the scale 2 includes marks with reflectivity R1, marks with reflectivity R2 (<R1), and non-reflecting portions with reflectivity≈0. Thus, as illustrated in FIG. 3B, the signal I has two types of amplitudes corresponding to the reflectivities R1 and R2. FIG. 3C shows a code sequence obtained by binarizing the signal I using a threshold $TH_{peak}$. As shown, larger amplitudes of the signal I are each turned into code 1 and smaller amplitudes of the signal I are each turned into code 0. In the code sequence "001101110110100100111000" shown in FIG. 3C, "110100" enclosed with a solid line is a code sequence corresponding to the absolute position. The code sequence corresponding to the absolute position is associated therewith with respect to each pitch of the mark sequence (mark arrangement) on the scale 2. This means that the absolute position obtained from the code sequence has a resolution of the pitch.

Figure 4:
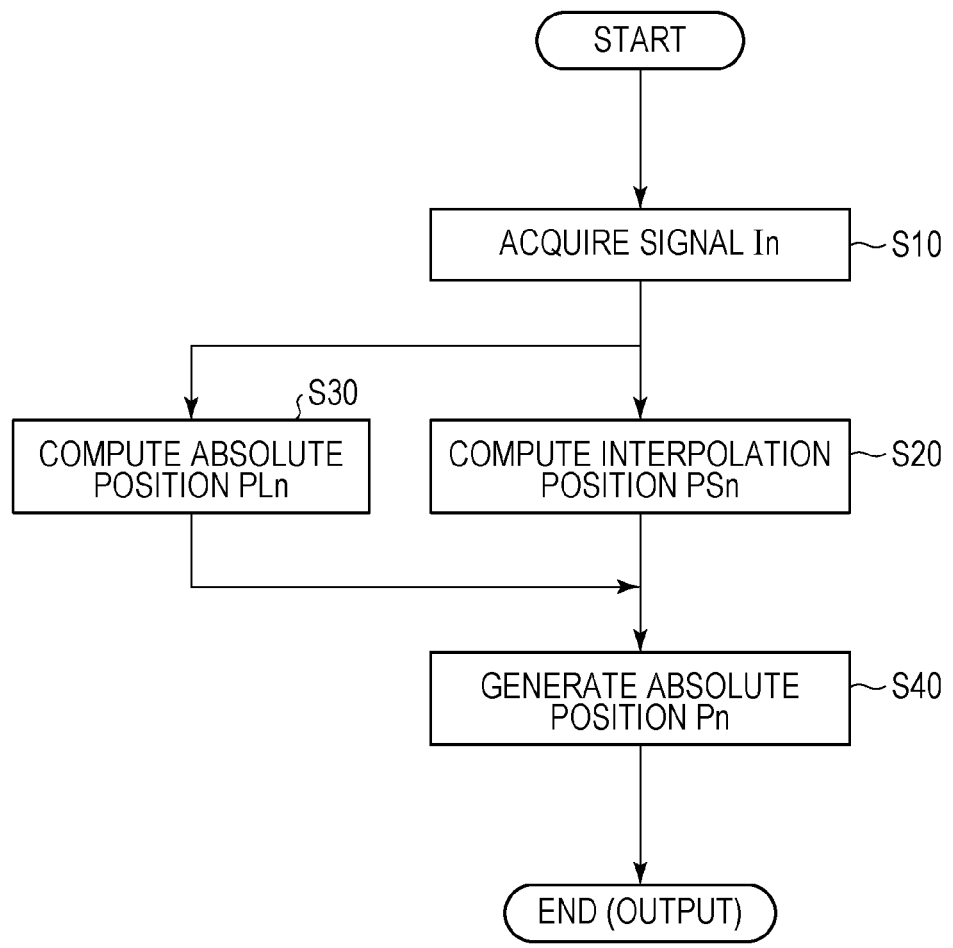
FIG. 4 is a flowchart illustrating a process of determining an absolute position Pn.

FIG. 4 illustrates a process in which the processing unit 3 determines an absolute position Pn. On the basis of the signal I, the processing unit 3 determines an absolute position PL having a one-pitch resolution (i.e., a resolution of one pitch in the mark sequence) and an interpolation position PS having a resolution smaller than that of the absolute position PL. Then, the processing unit 3 combines the absolute position PL and the interpolation position PS to determine an absolute position P having a resolution smaller than the one pitch described above. Here, the acquisition timing of acquiring the signal I is represented by Tn, and the suffix "n" is used to indicate a correspondence with the timing. Referring to FIG. 4, the processing unit 3 starts the process in accordance with a request from a higher-level device or the like. First, the processing unit 3 acquires a signal In (step S10). Next, the processing unit 3 determines an interpolation position PSn from the signal In (step S20) and determines an absolute position PLn from the signal In and a candidate group Cn (described below) (step S30). Then, the processing unit 3 generates an absolute position Pn from the interpolation position PSn and the absolute position PLn (step S40). The absolute position Pn is generated by combining the absolute position PLn (higher-order bits) and the interpolation position PSn (lower-order bits). The processing unit 3 outputs the absolute position Pn at the end of the process. The process described above is performed at each acquisition timing Tn.

Figure 5:
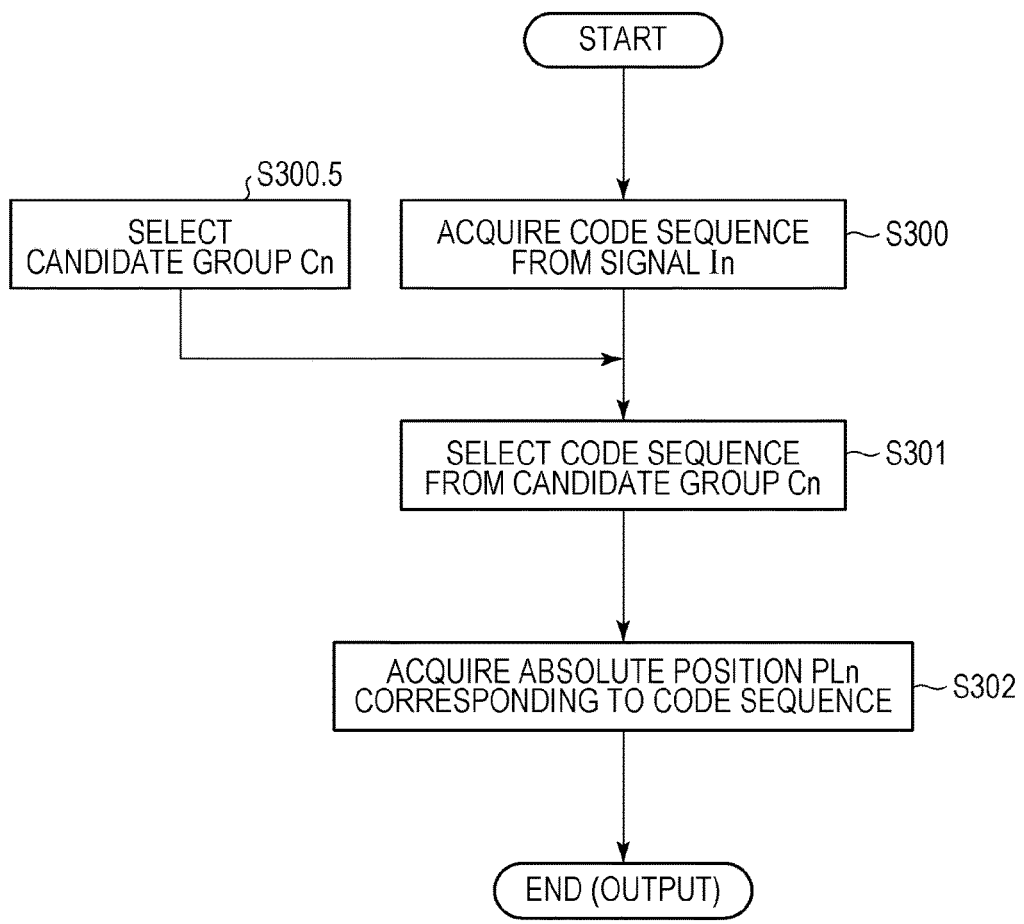
FIG. 5 is a flowchart illustrating a process of determining an absolute position PLn.

FIG. 5 is a flowchart illustrating details of the process of determining the absolute position PLn (in step S30). The processing unit 3 first acquires a code sequence on the basis of the signal In through the binarization described above (step S300). Subsequently (or occasionally before step S300), the processing unit 3 selects a candidate group Cn for a code sequence corresponding to the absolute position PLn to be determined, on the basis of an absolute position estimated for the absolute position PLn to be determined (i.e., an estimate for the absolute position PLn) (step S300.5). The estimate for the absolute position PLn can be determined, for example, on the basis of an absolute position Pn−α corresponding to acquisition timing Tn−α (α is at least one natural number greater than or equal to 1). The candidate group Cn corresponding to the acquisition timing Tn is a set of candidates for the code sequence to be acquired from the signal I detected at the acquisition timing Tn, and can be selected from estimates for the absolute position PLn. The details will be described later on with reference to FIG. 11.

Next, the processing unit 3 selects a code sequence corresponding to the absolute position PLn from the candidate group Cn, on the basis of the distance between the code sequence based on the signal I (i.e., code sequence obtained by the binarization described above) and each of code sequences in the candidate group Cn (step S301). Next, by referring to a lookup table or the like, the processing unit 3 acquires the absolute position PLn corresponding to the code sequence selected in step S301 (step S302). The processing unit 3 outputs the absolute position PLn at the end of the process.

The code sequence acquired in step S300 may contain errors (incorrect codes) because the waveform (amplitude etc.) of the signal In is varied by scratches or dirt on the scale 2. For example, even when marks are arranged on the scale 2 to correspond to "111111", the code sequence "110111" may be acquired if the amplitude of the signal In is partially lowered by dust adhering to the scale 2. Since "111111" and "110111" correspond to completely different absolute positions, an incorrect absolute position may be output.

To reduce such an error, the processing unit 3 selects the candidate group Cn and then selects a code sequence in the candidate group Cn. The selection of a code sequence involves determining a Hamming distance Hdi between a code sequence i ("i" is a suffix for identifying the code sequence) included in the candidate group Cn and the acquired code sequence. The details will be described later on with reference to FIG. 6. For two code sequences having the same number of codes (digits), the Hamming distance Hdi between them is the number of digits (pairs of codes) at which the corresponding codes are different from each other. Although a Hamming distance is used in the present embodiment to define the distance between code sequences, other indexes of similarity (degrees of similarity) between two code sequences may be adopted. For example, such indexes as Jaro distance, Jaro-Winkler distance, Sorensen similarity index, Czekanowski similarity index, Bray-Curtis dissimilarity, Spearman's rank correlation coefficient, and Kendall tau rank correlation coefficient are known. In selecting a code sequence from a candidate group, it is necessary to take into account that there are two types of indexes: the one that increases in value with decreasing similarity, such as a Hamming distance, and the other that increases in value with increasing similarity.

A method for selecting a code sequence from the candidate group Cn on the basis of the acquired code sequence will now be described. In the candidate group Cn, a code sequence i having the smallest Hamming distance to the acquired code sequence is represented by code_min, and the smallest Hamming distance is represented by Hd_min. Although code_min can be closest to the acquired code sequence, it is not clear whether code_min is the code sequence to be acquired. Therefore, it is desirable to determine whether the degree of matching of code_min with the acquired code sequence is absolutely sufficiently high, and whether the degree of matching of code_min with the acquired code sequence is relatively sufficiently high as compared to the other code sequences i in the candidate group Cn. For the determinations, the present embodiment uses two thresholds: a threshold $TH_A$ (first threshold) for the absolute degree of matching, and a threshold $TH_R$ (second threshold) for the relative degree of matching.

The threshold $TH_A$ for the absolute degree of matching is a threshold used for Hd_min to determine whether code_min sufficiently matches the acquired code sequence. For example, assume that the number of bits in the acquired code sequence is 10 and Hd_min is 8. In this case, since there are only two code matches between the acquired code sequence and code_min, the absolute degree of matching is low. Thus, the threshold $TH_A$ for the absolute degree of matching is set, and the absolute degree of matching (high or low) is determined by whether Hd_min<$TH_A$ is satisfied. The threshold $TH_R$ is a threshold used to determine whether the degree of matching of code_min with the acquired code sequence is relatively high as compared to the other code sequences i in the candidate group Cn. When a code sequence i having the second smallest Hamming distance, in the candidate group Cn, to the acquired code sequence is represented by code_min2 and the second smallest Hamming distance is represented by Hd_min2, a value obtained by subtracting Hd_min from Hd_min2 can be used as an index indicating to what extent the degree of matching of code_min is higher than those of the other code sequences i in the candidate group Cn. Thus, the threshold $TH_R$ for the relative degree of matching is set, and the relative degree of matching (high or low) of code_min with respect to the other code sequences i is determined by whether Hd_min2−Hd_min>$TH_R$ is satisfied.

In the present embodiment, if determination conditions (tolerable conditions or predetermined conditions associated with the degree of similarity) for these two thresholds are satisfied, code_min is selected as a code sequence corresponding to the acquired code sequence (i.e., as a code sequence corresponding to the absolute position). If at least one of the two conditions is not satisfied, a code sequence E corresponding to the estimate for the absolute position PLn described above is selected on the basis of the determination that the reliability of the acquired code sequence is low.

Figure 6:
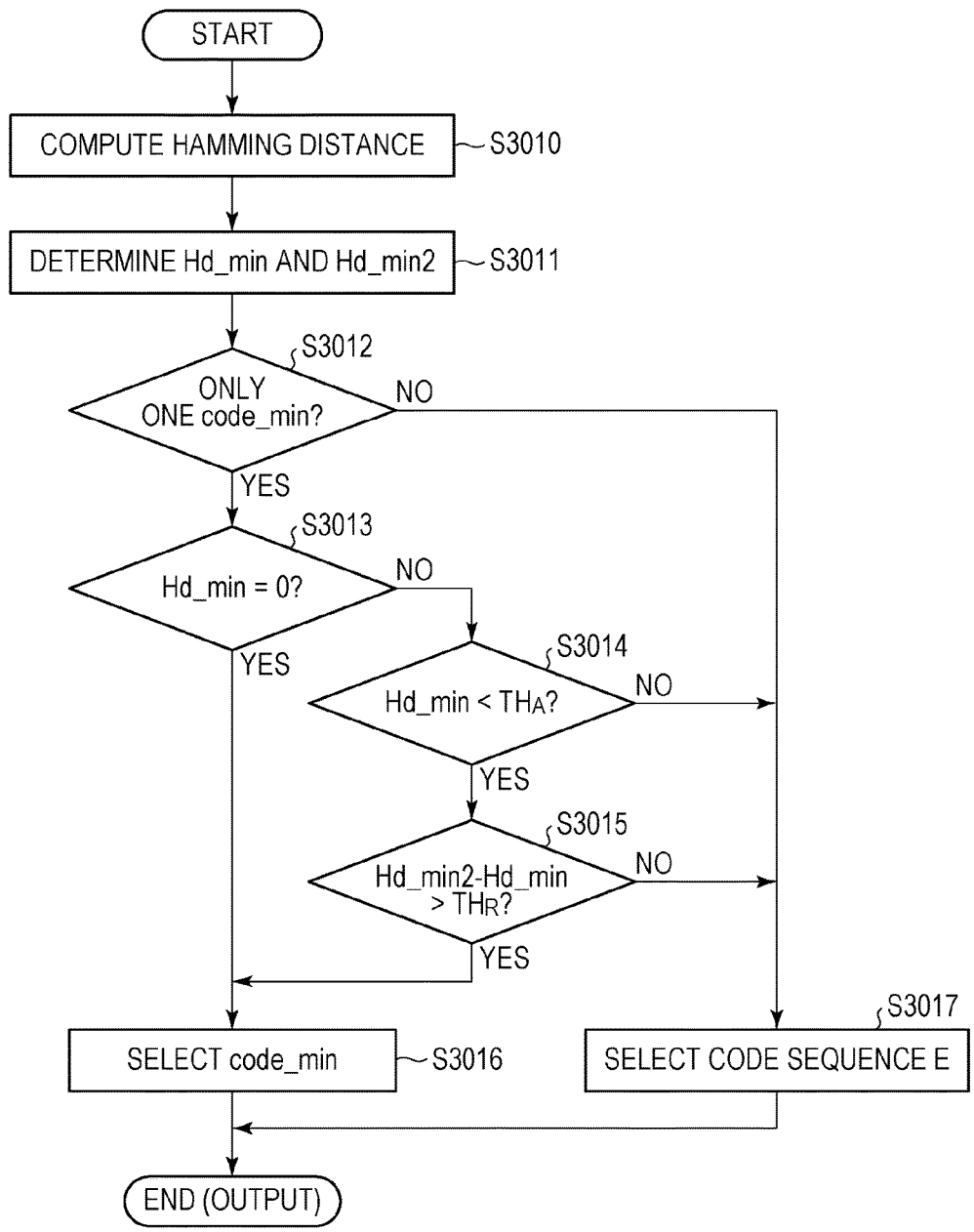
FIG. 6 is a flowchart illustrating a process of selecting a code sequence.

With reference to FIG. 6, the operation in step S301 of FIG. 5 will be described in detail. FIG. 6 is a flowchart illustrating a process of selecting a code sequence. First, the processing unit 3 computes the Hamming distance between the acquired code sequence and each of code sequences in the candidate group Cn (step S3010). Next, the processing unit 3 compares the resulting Hamming distances to determine the smallest Hamming distance Hd_min and the second smallest Hamming distance Hd_min2 (step S3011). Next, the processing unit 3 determines whether there is only one code sequence having Hd_min (step S3012). If there is more than one such a code sequence, the processing unit 3 selects the code sequence E, because the condition of Hd_min<$TH_A$ is not satisfied from the condition of Expression (1) described below (step S3017). If there is only one code sequence having Hd_min, the processing unit 3 determines the code sequence to be code_min, and then determines whether Hd_min=0 is satisfied (step S3013). If the determination is Yes (positive), since the acquired code sequence and code_min perfectly match, the processing unit 3 selects code_min as a code sequence corresponding to the code sequence acquired without an error (step S3016). In the case of Hd_min≠0 (i.e., if there is some error in acquiring a code sequence), the processing unit 3 determines whether Hd_min is smaller than the threshold $TH_A$ (i.e., compares Hd_min with the threshold $TH_A$) (step S3014). If Hd_min<$TH_A$ is satisfied, then the processing unit 3 determines whether Hd_min2−Hd_min is greater than the threshold $TH_R$ (i.e., compares Hd_min2−Hd_min with the threshold $TH_R$) (step S3015). If the conditions of both steps S3014 and S3015 are satisfied, the processing unit 3 selects code_min as a code sequence corresponding to the code sequence acquired with some error (step S3016). If one of the conditions of steps S3013 and S3014 is not satisfied, the processing unit 3 selects the code sequence E as a code sequence corresponding to the code sequence acquired with some error and having low reliability (step S3017). Even when there is more than one code sequence having Hd_min2 in step S3011, there is no need to change the subsequent process.

Figure 7:
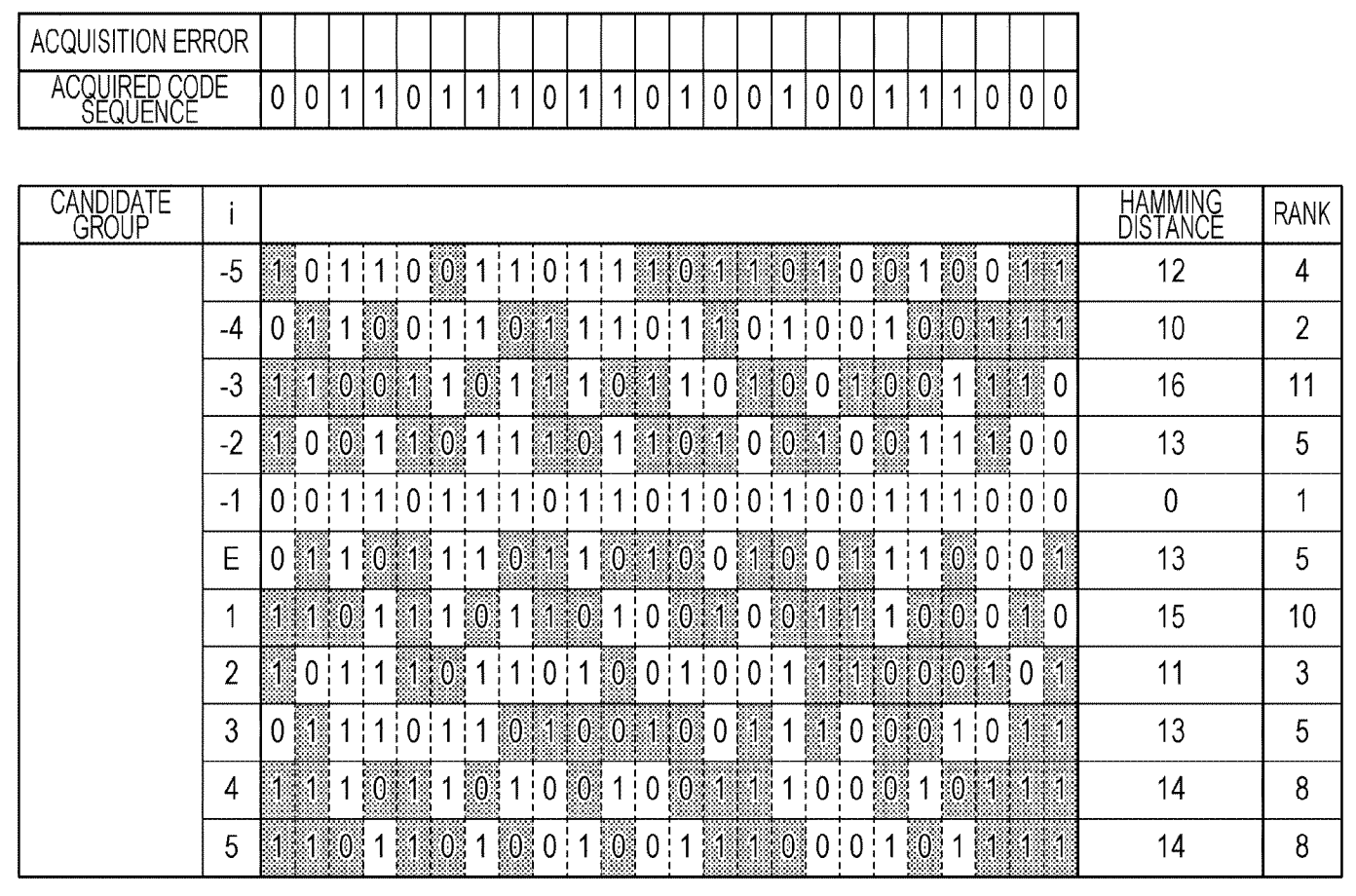
Figure 8:
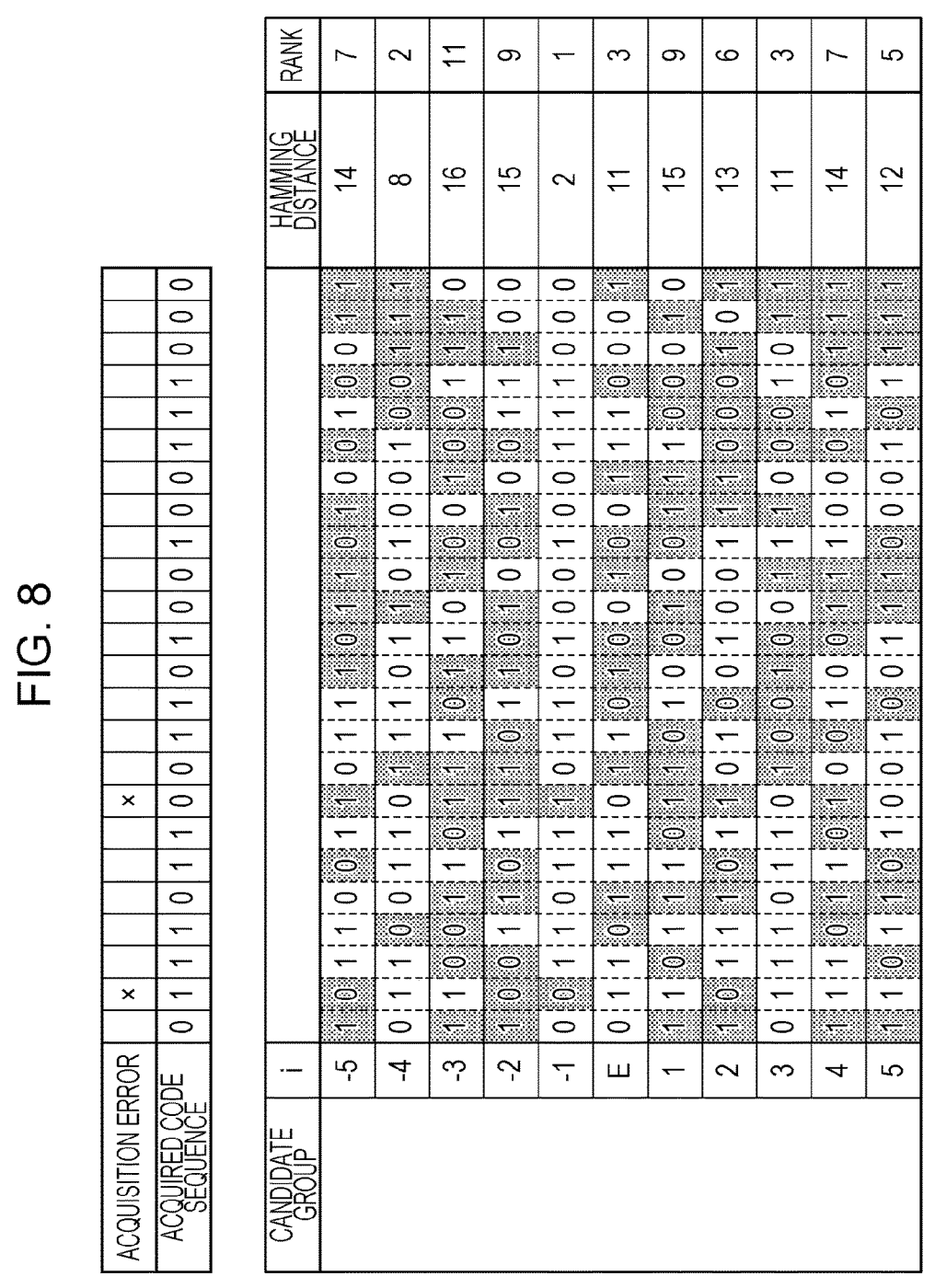
Figure 9:
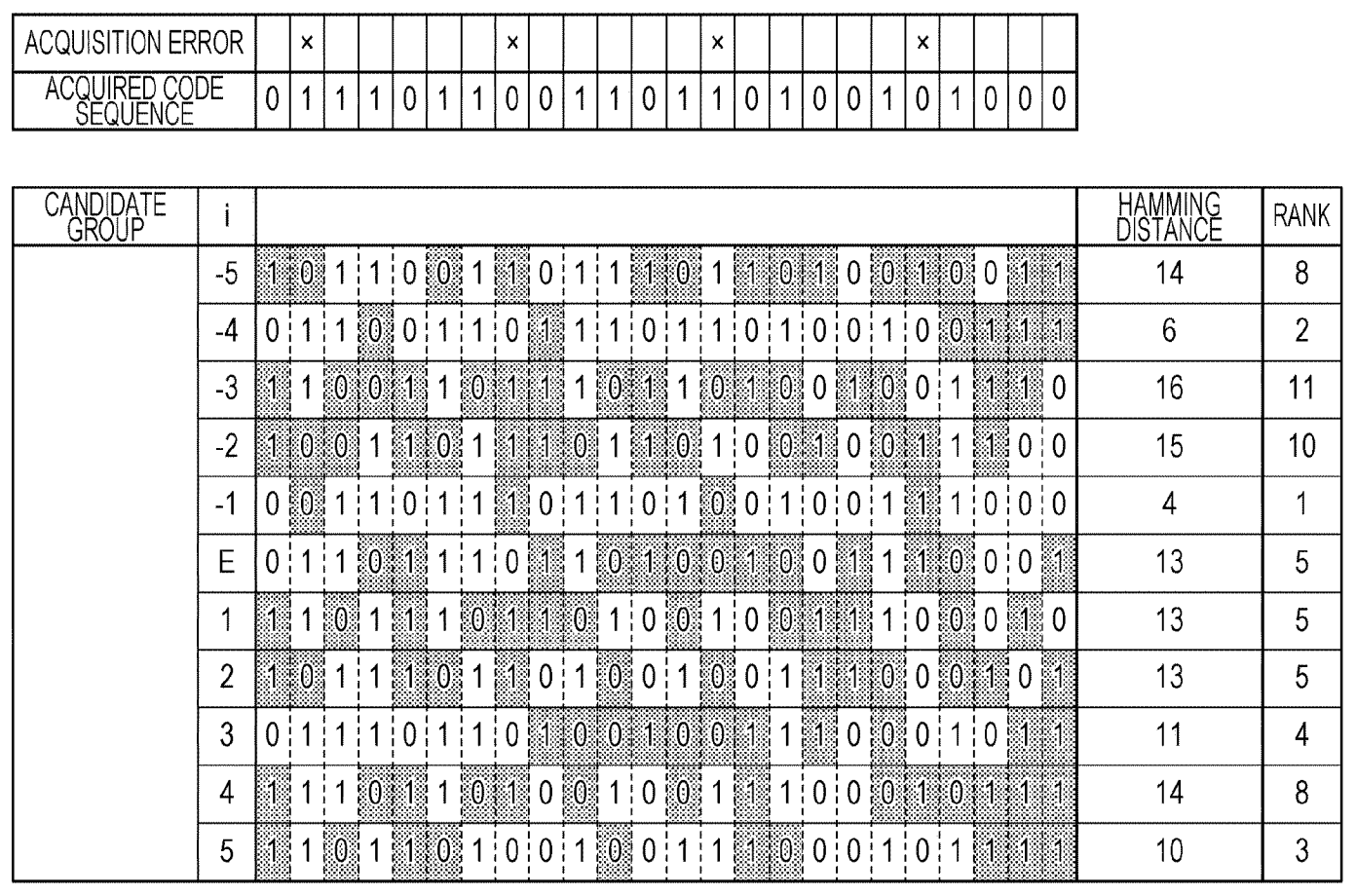

FIGS. 7 to 9 each illustrate a concrete example of selecting a code sequence. Specifically, FIG. 7 illustrates an example with no error in acquisition of a code sequence, FIG. 8 illustrates an example with a few errors in acquisition of a code sequence, and FIG. 9 illustrates an example with many errors in acquisition of a code sequence. In each example, the candidate group Cn includes 11 code sequences. In each drawing, the suffix "i" attached to each code sequence indicates that the code sequence provided with "i" corresponds to a mark sequence which is a distance of "scale pitch×i" away from the mark sequence corresponding to the code sequence E on the scale. In each drawing, "Hamming distance" shows the Hamming distance between the acquired code sequence and each code sequence in the candidate group Cn, "rank" shows ranks assigned to Hamming distances in ascending order. In the examples of FIGS. 7 to 9, the threshold $TH_A$ is set to 3 and the threshold $TH_R$ is set to 4.

In the example of FIG. 7, only the code sequence i=−1 has a Hamming distance of 0 (zero) and the code sequence i=−1 is code_min. Therefore, in accordance with the determination in step S3013 of FIG. 6, the code sequence i=−1, that is, the code sequence "0011011101101001111000" is selected. In the example of FIG. 8, again, only the code sequence i=−1 has the smallest Hamming distance and the code sequence i=−1 is code_min. However, since the Hamming distance is 2 (not 0), the determination condition in step S3014 is satisfied as follows: "Hd_min=2<$TH_A$=3". Since the Hamming distance of the code sequence i=−4 is the second smallest and Hd_min2=8, the determination condition in step S3015 is satisfied as follows: "Hd_min2−Hd_min=6>$TH_R$=4". Therefore, in accordance with the determination in step S3015, the code sequence i=−1 is selected.

In the example of FIG. 9, again, only the code sequence i=−1 has the smallest Hamming distance and the code sequence i=−1 is code_min. However, since the Hamming distance is 4, the determination condition in step S3014 is not satisfied as follows: "Hd_min=4>TH$_A$=3". Therefore, since the reliability of the acquired code sequence is low, the code sequence E is selected from the candidate group Cn in accordance with the determination in step S3014.

As described above, a plurality of code sequences for each of which the distance to the acquired code sequence is determined are limited to those in the candidate group Cn. This can have advantageous effects on improving efficiency in determining the absolute position (code sequence) and reducing errors in the absolute position. For example, as compared to the case in which the acquired code sequence is compared to all code sequences corresponding to the absolute position, the processing time can be reduced to about "the number of code sequences included in the candidate group Cn"/"the number of all code sequences". In related art, a code sequence acquired with errors may match a code sequence different from the original one, and an incorrect absolute position may be output. In contrast, the present embodiment can reduce the possibility of selecting an incorrect code sequence unless such a code sequence is included in the candidate group Cn, and thus can reduce errors in the absolute position.

Figure 10:
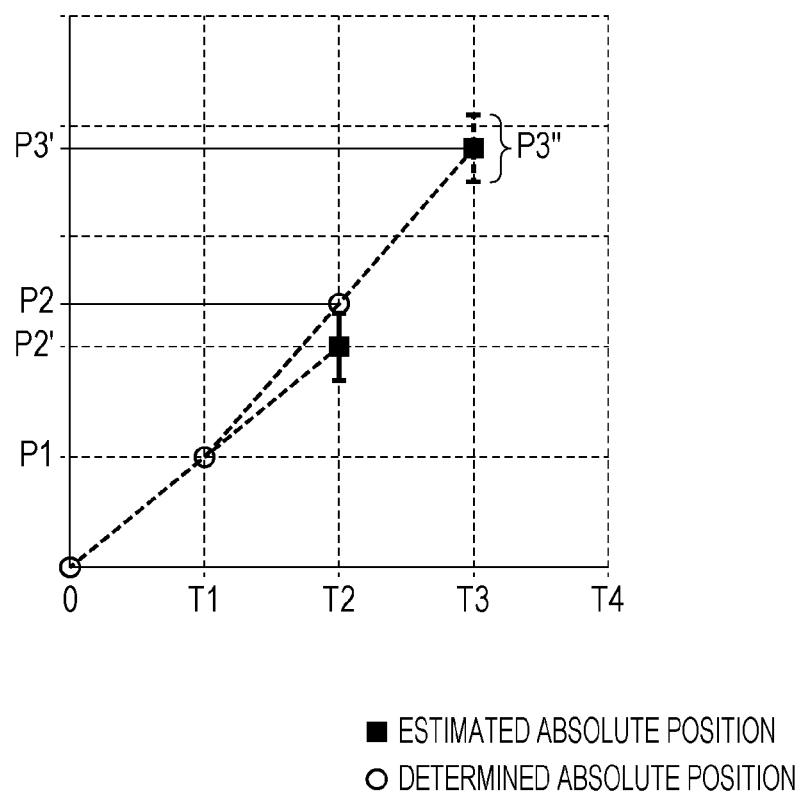
FIG. 10 shows exemplary estimation of an absolute position for selecting a code sequence candidate group.
Figure 11:
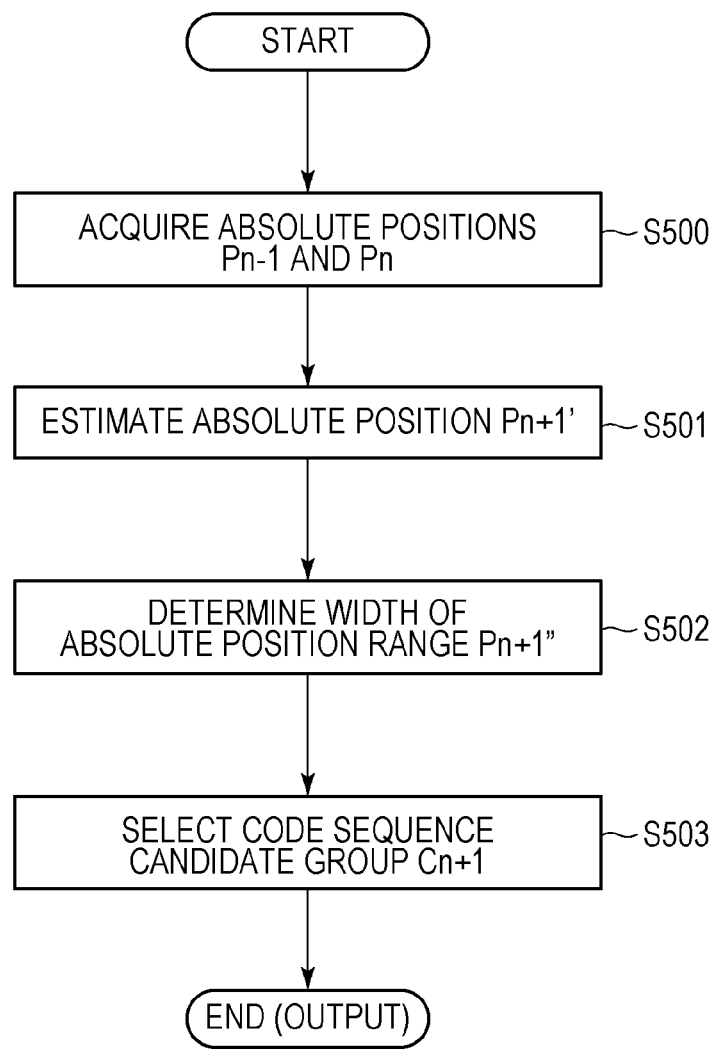
FIG. 11 is a flowchart illustrating a process of selecting a code sequence candidate group.

To make it possible to output a correct absolute position, it is necessary that a code sequence corresponding to a correct absolute position be always included in the candidate group Cn, and that there be no similar code sequences in the candidate group Cn. A process of selecting a candidate group to ensure that a code sequence corresponding to a correct absolute position is always included in the candidate group Cn (in step S300.5 of FIG. 5) will now be described in detail. FIG. 10 shows exemplary estimation of an absolute position for selecting a code sequence candidate group. FIG. 11 is a flowchart illustrating a process of selecting a code sequence candidate group. FIG. 10 shows a relationship between an already determined (previously obtained) absolute position (indicated by an open circle) and an absolute position obtained by estimation (indicated by a filled square) with respect to acquisition timing Tn for acquiring a signal I. An absolute position determined at acquisition timing Tn is indicated by Pn, an absolute position obtained by estimation is indicated by Pn', and an absolute position range corresponding to a candidate group is indicated by Pn".

Referring to FIG. 11, first, as a plurality of absolute positions already determined, the processing unit 3 acquires an absolute position Pn−1 at timing Tn−1 and an absolute position Pn at timing Tn (step S500). Next, the processing unit 3 determines the relative velocity between the detecting unit 1 and the scale 2 from (Pn−Pn−1)/(Tn−Tn−1), and estimates an absolute position Pn+1' at timing Tn+1 on the basis of the relative velocity, time (Tn+1−Tn), and the absolute position Pn (step S501). Next, the processing unit 3 determines the width of an absolute position range Pn+1" for a candidate group Cn+1 at timing Tn+1 (step S502). The width may be either a fixed or variable value. The width can be determined, for example, on the basis of a maximum relative acceleration between the detecting unit 1 and the scale 2. Alternatively, the width may be determined by updating its value (initial value) through learning based on an actual estimation error of the absolute position. Next, the processing unit 3 selects the code sequence candidate group Cn+1 on the basis of the estimated absolute position Pn+1' and the determined width of the absolute position range Pn+1" (step S503). In the candidate group Cn+1, a code sequence corresponding to the estimated absolute position Pn+1' is referred to as the code sequence E.

When the width of the absolute position range Pn+1" for the candidate group Cn+1 is determined on the basis of the maximum relative acceleration as described above, full consideration can be given to an error in the relative velocity determined as described above. This can ensure that a code sequence corresponding to a correct absolute position at timing Tn+1 is always included in the candidate group Cn+1 (unless there is an exceptional abnormality). In the method which involves using the learning described above, for example, the width of the absolute position range Pn+1" for the candidate group Cn+1 may be determined by multiplying an error between the estimated absolute position Pn' and the actually obtained absolute position Pn by a safety coefficient (safety factor) K (>1). This can reduce the number of code sequences included in the candidate group, and thus is advantageous in reducing the processing time required to select a code sequence. The width of the absolute position range Pn+1" for the candidate group Cn+1 may be determined by various other methods depending on the application of the absolute encoder.

A method used to ensure that there are no similar code sequences in the candidate group Cn will now be described. This needs to be ensured so as to reduce errors in selecting a code sequence in step S301 of FIG. 5. The thresholds TH$_A$ and TH$_R$ described above can be used as a measure of "similar code sequences". The number of bits in a code sequence representing an absolute position is represented by N (N=6 in the present embodiment), and the number of bits in a code sequence acquired through the detecting unit 1 is represented by X (X≥N). A smallest Hamming distance among those between X-bit code sequences included in any candidate group Cn with an absolute position range having a predetermined width is represented by Hd$_{xmin}$. If Hd$_{xmin}$ satisfies the following relational expression, no error occurs in selecting a code sequence in step S301:

$$Hd_{xmin} > TH_A \times 2 + TH_R \qquad \text{Expression (1)}$$

If Expression (1) is satisfied, no error occurs in selecting a code sequence. This will now be described. In the candidate group Cn, a combination of code sequences having the smallest Hamming distance Hd$_{xmin}$ therebetween is a combination of most similar code sequences, which are therefore most prone to cause an error in the selection in step S301 of FIG. 5. Here, one of the code sequences in such a combination is referred to as code sequence 1, and the other is referred to as code sequence 2. Also, a code sequence acquired by detecting a mark sequence corresponding to code sequence 1 is referred to as code sequence 3. The Hamming distance between code sequence 1 and code sequence 2 is represented by Hd$_{12}$ (=Hd$_{xmin}$), the Hamming distance between code sequence 1 and code sequence 3 is represented by Hd$_{13}$, and the Hamming distance between code sequence 2 and code sequence 3 is represented by Hd$_{23}$. If there is no error in acquiring code sequence 3, Hd$_{13}$=0 and Hd$_{23}$=Hd$_{xmin}$ are satisfied. Next, assume that there are M code errors in acquiring code sequence 3. Also assume that, of the M code errors, M$_e$ errors are those in codes for which code sequence 1 and code sequence 2 have the same value, and M$_u$ errors are those in codes for which code sequence 1 and code sequence 2 have different values. In this case, Hd$_{13}$=M and Hd$_{23}$=Hd$_{xmin}$+M$_e$−M$_u$ are satisfied. The Hamming distance Hd$_{23}$ is minimized when there are M errors in codes for which code sequence 1 and code sequence 2 have different values, that is, when M=M$_u$. In this case, Hd$_{13}$=M$_u$ and Hd$_{23}$=Hd$_{xmin}$−M$_u$ are satisfied.

To select code sequence 1 from the candidate group Cn, the following conditions need to be satisfied:

$$Hd_{13} < TH_A$$

$$Hd_{23} - Hd_{23} > TH_R \quad \text{Expression (2)}$$

Substituting $Hd_{23} = M_u$ and $Hd_{23} = Hd_{xmin} - M_u$ into Expression (2) yields Expression (3) below:

$$Hd_{23} = M_u < TH_A$$

$$Hd_{23} - Hd_{23} = Hd_{xmin} - M_u - M_u = Hd_{xmin} - M_u \times 2 > TH_R \quad \text{Expression (3)}$$

Modifying the second expression in Expression (3) yields the following expression:

$$Hd_{xmin} > M_u \times 2 + TH_R \quad \text{Expression (4)}$$

From $M_u < TH_A$, Expression (4) is always satisfied if the following expression is satisfied:

$$Hd_{xmin} > TH_A \times 2 + TH_R \quad \text{Expression (5)}$$

Therefore, if a code sequence corresponding to the mark sequence on the scale 2 is adopted such that Expression (1) is satisfied for any candidate group Cn, no error occurs in selecting a code sequence from the candidate group Cn.

Figure 12:
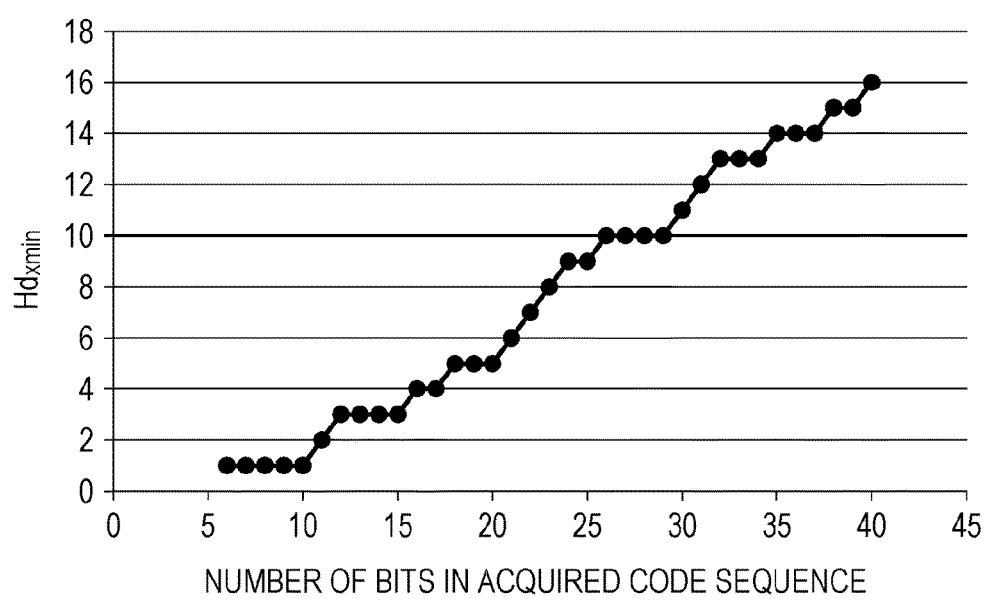
FIG. 12 shows a relationship between the number of bits X in an acquired code sequence and $Hd_{xmin}$.

A code sequence to be adopted will now be described. When a pseudorandom number sequence, such as an m-sequence, is adopted as a code sequence, code sequences having a small Hamming distance therebetween tend to be arranged close to each other. Even in this case, Expression (1) can be satisfied by increasing the number of bits X in the code sequence acquired from the scale 2. FIG. 12 shows a relationship between the number of bits X in an acquired code sequence and $Hd_{xmin}$. As can be understood from FIG. 12, $Hd_{xmin}$ can be increased by increasing the number of bits X. To increase $Hd_{xmin}$, a code sequence including codes (a start mark) indicating the starting point of the code sequence may be adopted as a code sequence corresponding to the absolute position. Thus, since code sequences corresponding to the absolute position can be arranged in any order, code sequences having a large Hamming distance therebetween can be arranged close to each other to satisfy Expression (1).

Figure 13:
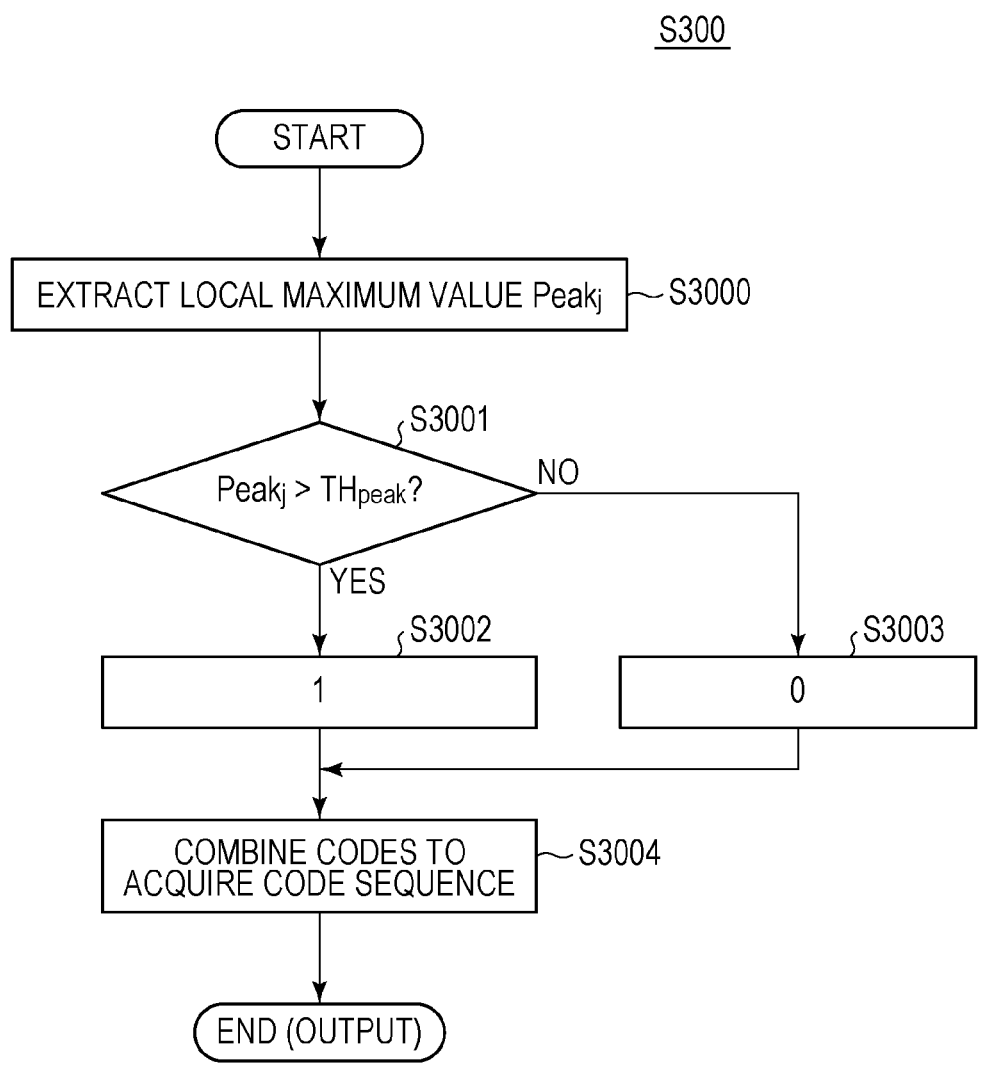
FIG. 13 is a flowchart illustrating a process of acquiring a code sequence from an output of the detector.

A process of acquiring a code sequence from the output of the detecting unit 1 in step S300 of FIG. 5 will be described in detail with reference to FIGS. 3A to 3C and FIG. 13. FIG. 13 is a flowchart illustrating the process. First, the processing unit 3 extracts a local maximum value $Peak_j$ (amplitude) for each period of the signal I (see FIG. 3B) output from the detecting unit 1 (step S3000). The signal I has periods and amplitudes corresponding to pitches (intervals) and properties (e.g., light reflectivities) of marks in the mark sequence on the scale 2. The suffix "j" of the local maximum value $Peak_j$ indicates that the local maximum value corresponds to the j-th period in the signal I. In the example of FIGS. 3A to 3C, "j" is any one of 1, 2, . . . , and 24. Next, the processing unit 3 determines whether the local maximum value $Peak_j$ is greater than the threshold $TH_{peak}$ (step S3001). If the local maximum value $Peak_j$ is greater than the threshold $TH_{peak}$, the processing unit 3 associates code 1 (corresponding to reflectivity R1) with the local maximum value $Peak_j$ (step S3002). If the local maximum value $Peak_j$ is not greater than the threshold $TH_{peak}$, the processing unit 3 associates code 0 (corresponding to reflectivity R2) with the local maximum value $Peak_j$ (step S3003). Next, the processing unit 3 combines codes corresponding to the local maximum value $Peak_j$ (j=1, 2, . . . , and 24) to acquire a code sequence (see FIG. 3C) (step S3004), outputs the code sequence, and ends the process. In the acquired 24-bit code sequence "001101110110100100111000" shown as an example in FIG. 3C, a 6-bit code sequence "110100" enclosed with a solid line is a code sequence corresponding to the absolute position.

The method for determining each code is not limited to comparison between the local maximum value and the threshold described above, but may be any method that can identify the types of marks (e.g., reflectivities R1 and R2). For example, the processing unit 3 may perform a moving average that takes the average of the signal I at one-period intervals, so as to compare a moving average value corresponding to the local maximum value in each period of the signal I with a threshold. This method is effective in reducing errors in binarization, because the signal-to-noise (S/N) ratio is improved by averaging. The threshold $TH_{peak}$ may be either a fixed value prepared in advance, or a variable value determined on the basis of the signal I. If it is expected that the performance of the detecting unit 1 or the scale 2, or the relative positional relationship between the detecting unit 1 and the scale 2, will change with time, the variable value described above may be adopted to reduce errors in binarization. The threshold $TH_{peak}$ may be independent of "j", or may be varied with "j" by taking distortion (shading etc.) in the signal detected by the detecting unit 1 into consideration.

Figure 14:
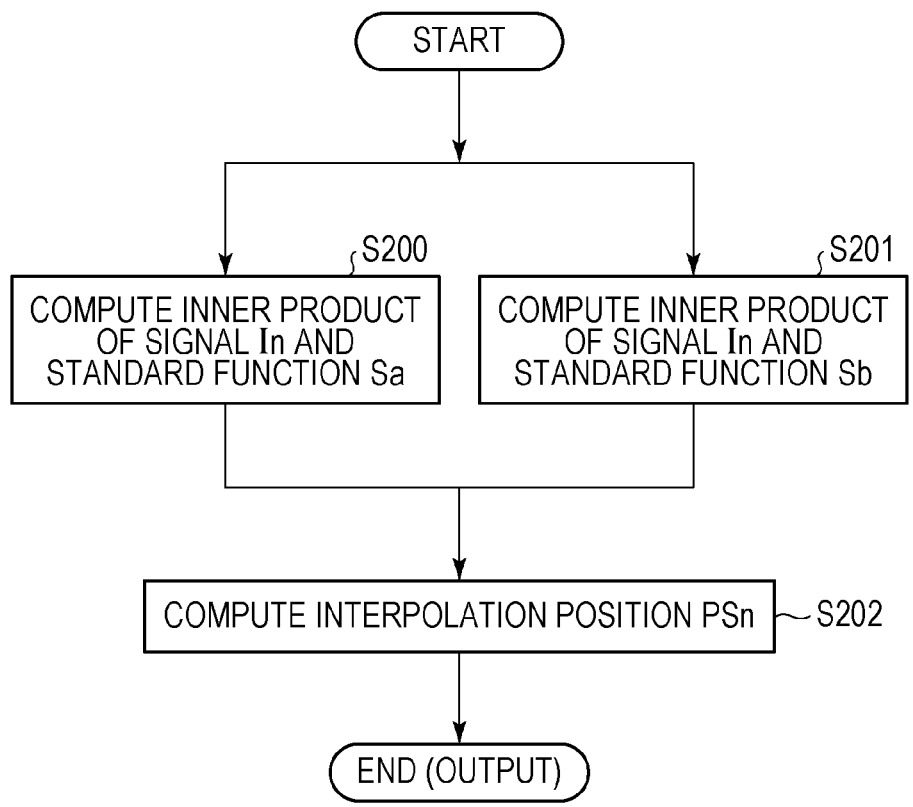
FIG. 14 is a flowchart illustrating a process of interpolating an absolute position acquired from a code sequence.

With reference to FIG. 14, a process of interpolating an absolute position acquired from a code sequence in step S20 of FIG. 4 will be described in detail. FIG. 14 is a flowchart illustrating the process. First, on the basis of the signal In, the processing unit 3 acquires the interpolation position PSn with a resolution smaller than the pitch (p) of marks in the mark sequence. As in Expression (6) below, the processing unit 3 computes the inner product (or the sum of products) of the signal In and a standard function Sa producing a sine wave (sin θ) having the same period as the signal In, and also computes the inner product (or the sum of products) of the signal In and a standard function Sb producing a cosine wave (cos θ) having the same period as the signal In (steps S200 and S201):

$$A = In \cdot Sa = In \cdot \sin\theta \approx a \sin\phi + \alpha s$$

$$B = In \cdot Sb = -In \cdot \cos\theta \approx a \cos\phi + \alpha c \quad \text{Expression (6)}$$

where a is a coefficient determined by the amplitude of the signal I, φ is a phase difference between the signal In and the standard function Sa (Sb), and αs and αc are determined by the phase difference φ and a difference between two amplitudes at both ends of the signal In.

Next, the processing unit 3 acquires the interpolation position PSn in accordance with Expression (7) below (step S202), and outputs the interpolation position PSn to end the process:

$$PSn = \{\text{ArcTan}(A/B)/2\pi\} * p \quad \text{Expression (7)}$$

Even if a harmonic component having a period shorter than the pitch (p) is contained in the signal In, using the inner products in Expression (6) can reduce the effect of the harmonic component. Besides, using the inner products is effective for precision of interpolation (reduction of interpolation errors) for distortion in the signal In caused by various factors.

As can be understood from the foregoing description, the present embodiment can provide an absolute encoder which is advantageous in terms of efficiency and accuracy in selecting a code sequence.

Other Embodiments

Although a reflective scale is shown as an example in FIGS. 1 and 2, the scale 2 may be of a transmissive type.

Although a single-track scale is shown as an example, the scale 2 may be a multi-track scale having absolute tracks (for absolute positions) and incremental tracks (for interpolation positions). Although a code sequence represented by a mark sequence is a pseudorandom number sequence in the embodiments described above, the code sequence is not limited to this. For example, the beginning of each code sequence (corresponding to the absolute position) may be marked by a start symbol, as described in PCT Japanese Translation Patent Publication No. 2004-529344. Such code sequences have more freedom in the arrangement of code sequences corresponding to the absolute position than pseudorandom number sequences, and thus can be more easily prepared.

Although a linear (linear travel) scale is shown as an example, the scale 2 may be a non-linear scale, such as a rotary scale (e.g., disk(-shaped), annular, or cylindrical scale). Although an absolute encoder for determining a one-dimensional absolute position is shown as an example, the absolute encoder is not limited to this, and may be one for determining a two-dimensional or three-dimensional absolute position.

Although diverging beams are used in the optical system shown in FIG. 2, collimated beams or converging beams may be used. If the detecting unit 1 is configured such that one period of a light signal from the scale 2 is detected by 12 light receiving elements, third or higher order harmonic components can be effectively reduced even when the distribution of light over the light receiving element array 5 does not form a sine wave. This makes it possible to determine an interpolation position with high precision. However, the number of light receiving elements for one period is not limited to this. In view of required precision and availability of components (light receiving element array etc.), the number of light receiving elements for one period may be three, four, six, or eight. The numerical expressions or values used in the computations described above may be changed to accommodate variation in sensitivity among elements of the light receiving element array 5 and unevenness in the distribution of light caused by the optical system. Approximate values appropriate for required precision may be used. The processing unit 3 may include a series or parallel analog processing circuit, and at least one of an analog-to-digital (A/D) converter and a digital processing circuit.

Although the absolute position PLn and the interpolation position PSn (corresponding to higher-order and lower-order bits) are combined to generate the absolute position Pn in the embodiment described above, the absolute position Pn may be generated by other methods. For example, in accordance with the level of resolution required for the operation mode or the intended use of the apparatus including the absolute encoder, only the absolute position PLn may be generated, either always or at appropriate times. In this case, the function of generating the interpolation position PSn may be removed or stopped.

Although the detecting unit 1 includes the light receiving element array 5 in the embodiment described above, the configuration is not limited to this. In accordance with the properties of marks on the scale 2, the detecting unit 1 may include an array of various elements. That is, the elements may be of any type as long as they detect physical quantities corresponding to the properties that identify multiple types of marks. For example, if the multiple types of marks on the scale 2 are multiple types of magnets (permanent magnets) that produce different magnitudes of magnetic fields, the detecting unit 1 may include an array of magnetic (magnetic field) detectors, such as Hall elements.

The embodiments described above may also be realized by performing the processing described below. That is, the processing is performed by supplying software (program) implementing the functions of the above-described embodiments to a system or apparatus via a network or various types of storage media, and causing a computer (or central processing unit (CPU) or micro-processing unit (MPU)) of the system or apparatus to read and execute the program. The computer corresponds to the processing unit 3 described above.

(Applications)

Figure 15:
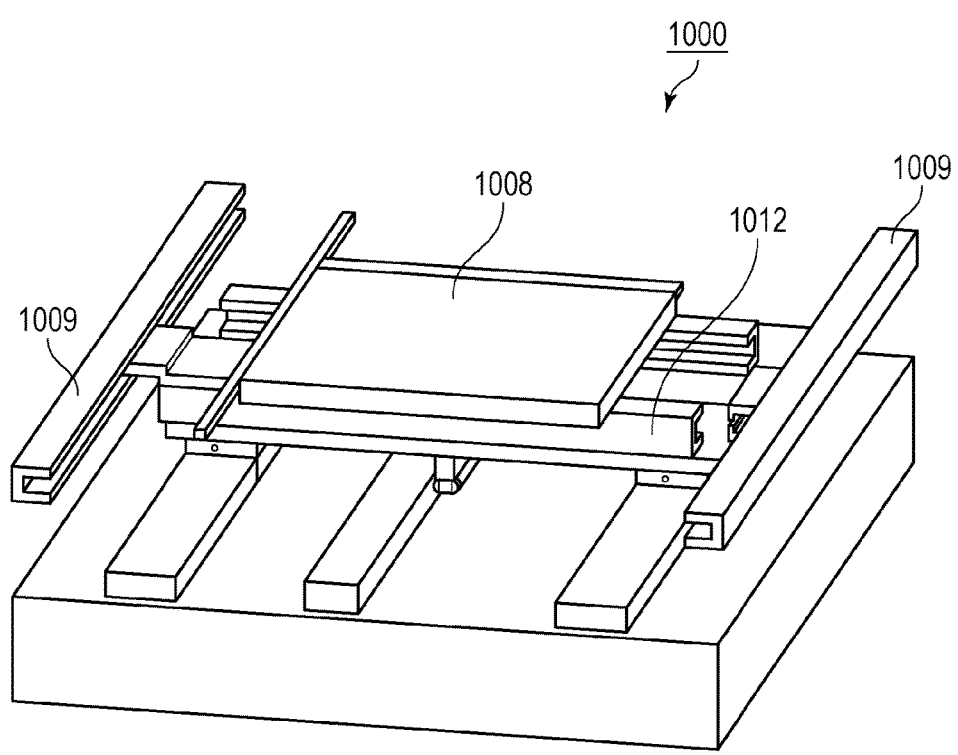
FIG. 15 illustrates an application of an absolute encoder.

Applications of the absolute encoder according to any of the embodiments described above will now be described. The absolute encoder does not require the operation for detecting the origin (reference position), and thus is useful when used with various driving machines or apparatuses, and robots, transport machines or apparatuses, and industrial machines or apparatuses (including machines or apparatuses for machining, processing, measuring, and manufacturing) that include the driving apparatuses. A driving apparatus may include a movable unit (movable device), an absolute encoder that measures the absolute position for movement of the movable unit, and a driving unit (driving device or actuator) that performs driving (a driving operation) associated with the motion (the movement) of the movable unit on the basis of the output from the absolute encoder. An application of the absolute encoder to a stage (XY stage) device will now be described, which is included in a lithography apparatus (e.g., exposure apparatus) serving as an industrial machine. FIG. 15 illustrates a configuration of a stage device 1000 in the present application.

A lithography apparatus is an apparatus that forms a pattern on a substrate, and can be embodied, for example, as an exposure apparatus, a drawing apparatus, or an imprint apparatus. The exposure apparatus forms a pattern (latent image pattern) on a substrate (or resist on the substrate) using, for example, ultraviolet (extreme ultraviolet) radiation. The drawing apparatus forms a pattern (latent image pattern) on a substrate (or resist on the substrate) using, for example, charged particle beams (e.g., electron beams). The imprint apparatus forms a pattern on a substrate by molding an imprint material on the substrate.

As illustrated in FIG. 15, the stage device 1000 includes Y-axis motors 1009 (driving device) used for moving a stage 1008 (movable device) in the Y-axis direction, and an X-axis motor 1012 (driving device) used for moving the stage 1008 in the X-axis direction. The absolute position of the stage 1008 can be obtained, for example, by mounting the scale 2 of the absolute encoder on one of a stator and a moving member of each motor, and mounting the detecting unit 1 of the absolute encoder on the other of the stator and the moving member of the motor.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2014-083137 filed Apr. 14, 2014, which is hereby incorporated by reference herein in its entirety.

What is claimed is:

1. An absolute encoder comprising:
a scale having a sequence of marks;
a detector configured to detect a signal corresponding to a plurality of marks of the scale; and
a processor configured to generate a signal group that includes a plurality of signals for which there is a high probability of being detected this time by the detector on a basis of at least one signal that has been detected by the detector in advance and configured to obtain degrees of similarity between the signal detected this time by the detector and respective signals included in the signal group and configured to obtain an absolute position corresponding to the signal detected this time on a basis of the degrees of similarity;
wherein the signal detected this time by the detector and each of the plurality of signals are a code sequence that includes a plurality of codes corresponding to the plurality of marks of the scale.

2. The absolute encoder according to claim 1, wherein the scale has a plurality of marks including a plurality of types of marks, the plurality of marks being arranged with a space thereamong and at a period.

3. The absolute encoder according to claim 1, wherein the processor is configured to select, as the code sequence corresponding to the detected signal, a code sequence, from plural code sequences satisfying a predetermined condition associated with the degree of similarity.

4. The absolute encoder according to claim 1, wherein the processor is configured to select the code sequence corresponding to the signal from plural code sequences based on a Hamming distance as the degree of similarity.

5. A driving apparatus comprising:
a movable device;
the absolute encoder, according to claim 1, configured to measure an absolute position associated with motion of the movable device; and
a driving device configured to perform driving associated with the motion of the movable device based on an output from the absolute encoder.

6. An absolute encoder according to claim 1,
wherein the marks of the scale are arranged in a direction of relative movement of the scale and the detector.

7. An absolute encoder according to claim 1,
wherein the plurality of signals for which there is a high probability of being detected this time by the detector is a part of all signals for which there is a possibility of being detected by the detector.

8. The absolute encoder according to claim 2, wherein the detector is configured to detect a signal corresponding to a number "X" marks of the scale; and
wherein the processor is configured to obtain an absolute position corresponding to a number "N" marks of the X marks (N<X) based on the detected signal, and
wherein the processor is configured to estimate an absolute position corresponding to the detected signal based on previously obtained absolute positions, to select, based on the estimated absolute position, plural code sequences from a group of code sequences, each formed by X codes and including a code sequence formed by N codes corresponding to the absolute position, and to select the code sequence corresponding to the detected signal from the plural code sequences based on a degree of similarity between a code sequence based on the detected signal and the plural code sequences.

9. The absolute encoder according to claim 3, wherein the processor is configured to select, if there is no code sequence satisfying the predetermined condition in plural code sequences, a code sequence corresponding to the estimated absolute position.

10. The absolute encoder according to claim 3, wherein the predetermined condition includes that
there is only one code sequence having the smallest distance in the plural code sequences, the distance representing the degree of similarity;
the smallest distance is smaller than a first threshold; and
a value, obtained by subtracting the smallest distance from the second smallest distance, is greater than a second threshold.

11. An industrial machine comprising a driving apparatus according to claim 5.

12. The absolute encoder according to claim 8, wherein the processor is configured to select the code sequence corresponding to the detected signal from the plural code sequences based on a degree of similarity between a code sequence formed by X codes based on the detected signal and a code sequence of the plural code sequences.

13. The absolute encoder according to claim 8, wherein the processor is configured to select the plural code sequences corresponding to a range of absolute positions including the estimated absolute position.

14. The absolute encoder according to claim 8, wherein the processor is configured to select, as the code sequence corresponding to the detected signal, a code sequence, from the plural code sequences, satisfying a predetermined condition associated with a degree of similarity between a code sequence formed by X codes based on the detected signal and a code sequence of the plural code sequences;
the predetermined condition includes that there is only one code sequence having the smallest distance in the plural code sequences, the distance being an index of the degree of similarity, the smallest distance is smaller than a first threshold, and a value obtained by subtracting the smallest distance from the second smallest distance is greater than a second threshold; and
a value of X is set such that a condition $Hd_{xmin} > TH_A \times 2 + TH_R$ is satisfied, where each code of the code sequence is a binary code, $Hd_{xmin}$ is the smallest distance among a plurality of code sequences selectable as the plural code sequences, $TH_A$ is the first threshold, and $TH_R$ is the second threshold.

15. The absolute encoder according to claim 13, wherein the processor is configured to use, as the range, a range based on at least one of a relative acceleration between the detector and the scale and an error in the estimation.

16. The absolute encoder according to claim 13, wherein a width of the range is set in advance.

17. The absolute encoder according to claim 13, wherein the processor is configured to obtain a width of the range based on a value obtained by multiplying a previously obtained error in the estimation by a coefficient greater than 1.

18. A processing method of obtaining, based on a detected signal corresponding to a plurality of marks of a scale having a sequence of marks, an absolute position corresponding to the plurality of marks, the method comprising:
    generating a signal group that includes a plurality of signals for which there is a high probability of being detected this time by the detector on a basis of at least one signal that has been detected by the detector in advance;
    obtaining degrees of similarity between the signal detected this time by the detector and respective signals included in the signal group; and
    obtaining an absolute position corresponding to the signal detected this time on a basis of the degrees of similarity;
    wherein the signal detected this time by the detector and each of the plurality of signals are a code sequence that includes a plurality of codes corresponding to the plurality of marks of the scale.

19. The processing method according to claim 18, wherein the scale has a plurality of marks including a plurality of types of marks, the plurality of marks being arranged with a space thereamong and at a period.

20. The processing method according to claim 18, wherein, based on a detected signal corresponding to a number "X" marks of a scale having a plurality of marks including a plurality of types of marks, an absolute position corresponding to a number "N" marks of the X marks (N<X), the plurality of marks being arranged with a space thereamong and at a period, the processing method comprising:
    estimating an absolute position corresponding to the detected signal based on previously obtained absolute positions,
    selecting, based on the estimated absolute position, plural code sequences from a group of code sequences, each formed by X codes and including a code sequence formed by N codes corresponding to the absolute position; and
    selecting the code sequence corresponding to the detected signal from the plural code sequences based on a degree of similarity between a code sequence based on the detected signal and a code sequence of the plural code sequences.

21. A computer-readable storage medium storing a program that, if executed by a computer, causes the computer to execute the processing method according to claim 18.

* * * * *